United States Patent [19]

Everill

[11] Patent Number: 4,814,158

[45] Date of Patent: Mar. 21, 1989

[54] PROCESS FOR MAKING LIQUID FERRIC SULFATE

[75] Inventor: N. Rooke Everill, Celina, Tex.

[73] Assignee: Fini Enterprises, Inc., Celina, Tex.

[21] Appl. No.: 149,537

[22] Filed: Jan. 28, 1988

[51] Int. Cl.4 .................. C22B 23/00; C01B 41/14
[52] U.S. Cl. ................................. 423/558; 423/146
[58] Field of Search ................... 423/145, 146, 558

[56] References Cited

U.S. PATENT DOCUMENTS

| | | | |
|---|---|---|---|
| 2,424,866 | 7/1947 | Udy | 423/558 |
| 3,529,957 | 9/1970 | Kuonda et al. | 423/558 |
| 3,954,953 | 5/1976 | Satterwhite et al. | 423/146 |
| 4,707,349 | 11/1987 | Hjersted | 423/146 |

FOREIGN PATENT DOCUMENTS

| | | | |
|---|---|---|---|
| 61-215222 | 9/1986 | Japan | 423/558 |
| 61-286229 | 12/1986 | Japan | 423/558 |

*Primary Examiner*—Gary P. Straub
*Attorney, Agent, or Firm*—Ross, Howison, Clapp & Korn

[57] ABSTRACT

A process for the production of liquid ferric sulfate from finely-divided ferric oxide, sulfuric acid and water in a closed reaction vessel at temperatures ranging from about 130° C. to about 150° C. and pressures from about 30 psi to about 40 psi. The reaction time ranges from four to eight hours and produces liquid ferric sulfate having at least 10% trivalent iron.

5 Claims, No Drawings

PROCESS FOR MAKING LIQUID FERRIC SULFATE

BACKGROUND OF THE INVENTION:

1. Field of the Invention

This invention relates to a process for making liquid ferric sulfate. More particularly, it relates to a digestion process for producing liquid ferric sulfate from finely-divided iron ore, sulfuric acid and water.

2. Description of the Prior Art

Ferric sulfate is not a new product. It is commonly used in potable water and sewage treatment processes. These purification processes involve using ferric sulfate as a flocculant to remove suspended particles in the water.

Ferric sulfate has been produced from a variety of materials under different conditions. In the past, it has been commercialy produced by reacting flue dust with sulfuric acid in a batch process. U.S. Pat. No. 2,252,332, issued to Plummer, describes such a process for making dry ferric sulfate.

As disclosed in Plummer, the flue dust was a waste product of a smelter and had less than 60% total iron content. The reaction between the flue dust and ferric sulfate was exothermic and drove off the water from the reaction. The resultant product was a solid mass which usually took the form of fines, granules and large clumps.

Typically, a water treatment facility will purchase the dry ferric sulfate in bulk and store it in a silo until it is pneumatically transferred to the treatment tank. However, several problems are encountered in the use of dry ferric sulfate. One of the major problems is simply the transportation of the powder. It has a tendency to be hygroscopic and will frequently cake during storage.

Still another problem is that the dry ferric sulfate contains impurities from the initial feed stock of flue dust. These impurities are not removed during the sulfonation process so they form part of the solid mass that is produced. When the dry ferric sulfate is solubilized in the treatment water, these insoluble impurities precipitate as sludge. The total weight of the insoluble material could be as much as about 10% of the dry ferric sulfate. In addition to having to dispose of this sludge, the user also pays for material which does not perform any useful function.

Consequently, there is still a need in the industry for a coagulant that can be easily transported through pipes and valves without clogging and which does not introduce extraneous material into the water treatment process.

SUMMARY OF THE INVENTION

This invention relates to a process for the manufacture of liquid ferric sulfate from finely-divided iron ore, sulfuric acid and water in a closed vessel under superatmospheric conditions. In the preferred embodiment of this invention, the iron ore contains approximately 98% total iron by weight, and the sulfuric acid is about 93% pure. The reaction is maintained at about 140° C. and 35 psi for about 4 to 6 hours.

The preferred process is a batch procedure wherein a predetermined amount of water, finely-divided iron ore and concentrated sulfuric acid are placed in a closed container. The contents are agitated, and the mixture is heated to a temperature of about 140° C. at a pressure of about 35 psi by applying heat from an external source, such as a boiler. The rate of temperature increase should be carefully controlled to prevent a runaway reaction. A rise of about 5° C. every 15 minutes is preferred.

Once the reaction temperature and pressure are reached, the external heat source is shut down because the digestion process is exothermic and will produce sufficient heat to maintain the reaction temperature. The temperature of the reaction is maintained from about 130° C. to about 150° C. during the digestion process, which typically lasts from 4 to 8 hours at reaction temperature and pressure.

Once the digestion process is complete, the pressure is slowly released, and the temperature declines. The temperature should be lowered as fast as practical to prevent hydration of the ferric sulfate. The liquid ferric sulfate produced by the process of this invention will usually have about 12% trivalent iron.

DETAILED DESCRIPTION OF THE INVENTION

This invention relates to a new process for the production of liquid ferric sulfate using finely-divided iron ore, sulfuric acid and water. The liquid ferric sulfate produced by this process contains little, if any, insoluble material and is ideal for use in waste water treatment processes because there is no extraneous material to form sludge. Not only is the sludge removal problem eliminated, but the user does not pay for useless filler material.

The reaction is maintained at a temperature which can range from about 130° C. to about 150° C. It is preferred that the reaction temperature remain within a range from about 135° C. to about 145° C. and most preferred if it is maintained at or near 140° C. The pressure on the system may range from about 30 psi to about 40 psi, but a pressure of about 35 psi is preferred. The process requires from about 4 to 8 hours at reaction temperature and pressure, and the mixture is preferably agitated during the digestion process to ensure complete reaction.

In the preferred embodiment of this invention, finely-divided iron ore having a ferric oxide content of about 98% is combined with water and about 93% sulfuric acid in a closed reaction chamber. The iron ore could contain at little as 85% total iron, and less concentrated sulfuric acid, e.g., 40% by weight, could be used so long as it was present in sufficient quantity to react with the iron ore. However, lower concentrations of iron and sulfuric acid would result in a slower reaction rate and might not produce sufficient heat of reaction to be self-sustaining. It would also require additional external energy to get the mixture to reaction temperature and pressure.

The materials used in the preferred embodiment of this invention are commercially available. Finely-divided iron ore containing about 98% ferric oxide is commercially available from Densitech under the tradename Densimix.

This particular material contains about 66% [ferric] iron [and about 32% ferrous iron], and the particle size is less than about 20 microns which facilitates reaction with the sulfuric acid. Concentrated (92–95%) sulfuric acid is available from a variety of suppliers; e.g., Phelps Dodge sells $H_2SO_4$ which has a concentration of 93%.

The weight ratio of these ingredients will range from about 17 to 27% ferric oxide: 31 to 41 $H_2SO_4$: 37 to 47%

H₂O. A preferred range of weight ratios is from about 20 to 24% ferric oxide: 34 to 38% H₂SO₄: 40 to 44% H₂O. An especially preferred weight ratio is about 22% ferric oxide, 36% sulfuric acid and 42% water. The closed reaction chamber will preferably be heated to about 140° C., and the pressure will be held at about 35 psi for at least about 4 hours at reaction temperature while the mixture is agitated. When digestion is complete, the liquid ferric sulfate is quickly cooled to prevent undesired hydration, filtered and diluted, if necessary, to yield a solution having about 10% trivalent iron.

The temperature of the reaction should be kept at about 140° C. for best results, although a variance of 10° C. either way will not significantly affect the final product. The pressure in the reaction chamber should be maintained at about 35 psi, but it can vary from about 30 to 40 psi without deleterious effects. Reactions outside these temperature and pressure ranges tend to produce divalent iron or hydrated complex sulfur compounds (Fe₂(SO₄)₃ⓧ 5H₂O) instead of trivalent iron.

When the process is complete, the pressure relief valve in the reaction chamber is opened to reduce the pressure and lower the temperature. It is preferable to cool the hot liquid ferric sulfate as quickly as practical to prevent undesirable hydration of the ferric sulfate. Cooling can be accelerated by flowing cold water through the heating coils. Before entering a storage tank, the liquid preferably passes through a filter media to remove any undigested solid particles.

The liquid ferric sulfate produced by this invention contains up to about 12% trivalent iron. Since most commercial operations use solutions of about 10% trivalent iron, the liquid ferric sulfate is simply diluted with a predetermined amount of water which can be easily calculated by a person of ordinary skill in the art based on the specific gravity of the ferric sulfate solution.

The rate at which the temperature increases during start-up is important because of the danger of a runaway reaction. A preferred rate of increase is about 5° C. every 15 minutes until the reaction temperature of about 140° C. is reached. The rate of temperature decrease at the end of the reaction is also important, although not as critical as temperature increase during start-up. The liquid ferric sulfate should be cooled as quickly as practical because prolonged heating could drive the reaction past the desired end point and produce hydrated complex sulfur compounds. It is preferred that the temperature of the liquid ferric sulfate be reduced to about 75° C. within about 4 hours after the reaction is completed. The entire process from start-up to cool-down will typically be less than 12 hours, not including the time required to fill and empty the reaction chamber.

ACTUAL PRODUCTION RUN

Into a closed reaction chamber was pumped 26,500 liters of water, followed by 32,000 pounds of Densimix (98%) total ferric oxide). Next, 13,012 liters of concentrated (93%) sulfuric acid was added, and the temperature of the mixture rose to 83° C. from the heat of reaction. The temperature of the mixture was increased at the rate of about 5° C. every 15 minutes by indirect heat exchange using a schotchmatic 250 horsepower boiler. When the temperature was about 140° C. and pressure was about 32 psi, the boiler was turned off and the reaction proceeded on its own. The time from start-up to reaction temperature and pressure was about 2.5 hours. The temperature of the mixture at one point rose to about 147° C., at a pressure of about 34 psi. The pressure relief valve was opened to reduce temperature, and the reaction temperature dropped to about 143° C. at 34 psi. At about 4.5 hours after reaction temperature was reached, a sample tested at 11.53% trivalent iron. The reaction was stopped by slowly releasing pressure and circulating cold water through the heating coils. When the temperature had declined to about 100° C. at atmospheric pressure, the liquid ferric sulfate was pumped through a filter media and heat exchanged to about 75° C. before it entered a dilution tank. The volume of liquid ferric sulfate totaled 43,069 liters. It was diluted with 6,589 liters of water to produce a solution having about 10% trivalent iron.

The principle of the invention and the best modes in which it is contemplated to apply that principal have been described. It is to be understood that the foregoing is illustrative only and that other means and techniques can be employed without departing from the true scope of the invention as described in the following claims.

I claim:

1. A process for making aqueous ferric sulfate solution comprising the steps of:
   (a) combining in a closed reaction vessel a mixture of finely-divided ferric oxide, concentrated sulfuric acid and water comprising from about 17 to about 27 weight percent ferric oxide, from about 31 to about 41 weight percent concentrated sulfuric acid, and from about 37 to about 47 weight percent water;
   (b) heating said mixture to a reaction temperature of from about 130° C. to about 150° C. and a pressure of from about 30 PSI to about 40 PSI while agitating said mixture and while controlling the rate of temperature increase at about 5° C. per fifteen minutes;
   (c) maintaining said mixture at a temperature ranging from about 130° C. to about 150° C. and a pressure ranging from about 30 PSI to about 40 PSI for a period ranging from about four to about eight hours while continuing said agitation;
   (d) lowering the temperature and pressure of said mixture; and
   (e) collecting said aqueous ferric sulfate solution as a product of the process.

2. The process of claim 1 wherein said sulfuric acid has a concentration greater than about 90%.

3. The process of claim 1, wherein said sulfuric acid has a concentration of about 93%.

4. The process of claim 1, said mixture comprises about 22 weight percent ferric oxide, about 36 weight percent concentrated sulfuric acid, and about 42 weight percent water.

5. The process of claim 1 wherein the average particle size of said ferric oxide is less than about 20 microns.

* * * * *

UNITED STATES PATENT AND TRADEMARK OFFICE
CERTIFICATE OF CORRECTION

PATENT NO. : 4,814,158

DATED : March 21, 1989

INVENTOR(S) : N. Rooke Everill

It is certified that error appears in the above-identified patent and that said Letters Patent is hereby corrected as shown below:

```
Column 2, Line 61:
    After 66%, delete [ferric]

Column 2, Line 62:
    After iron, delete [and about 32% ferrous iron]

Column 2, Line 68:
    After 41, insert -- % --

Column 3, Line 59:
    After 98%, delete [)]

Column 4, Line 1:
    Spelling of "schotchmatic" should be changed to "Scotchmatic"

Column 4, Line 9:
    Add a space between the words "to" and "about"
```

Signed and Sealed this

Thirty-first Day of October, 1989

*Attest:*

DONALD J. QUIGG

*Attesting Officer*     *Commissioner of Patents and Trademarks*